United States Patent
Yaji

(10) Patent No.: US 8,294,963 B2
(45) Date of Patent: Oct. 23, 2012

(54) IMAGE FORMING APPARATUS

(75) Inventor: Masao Yaji, Tokyo (JP)

(73) Assignee: Oki Data Corporation, Tokyo (JP)

( * ) Notice: Subject to any disclaimer, the term of this patent is extended or adjusted under 35 U.S.C. 154(b) by 832 days.

(21) Appl. No.: 11/979,414

(22) Filed: Nov. 2, 2007

(65) Prior Publication Data

US 2008/0106765 A1    May 8, 2008

(30) Foreign Application Priority Data

Nov. 6, 2006    (JP) .................................. 2006-300162

(51) Int. Cl.
*G03F 3/08* (2006.01)
(52) U.S. Cl. .......................... 358/521; 358/1.9; 358/518
(58) Field of Classification Search .................. None
See application file for complete search history.

(56) References Cited

U.S. PATENT DOCUMENTS

| | | | | |
|---|---|---|---|---|
| 4,534,059 A * | 8/1985 | Yamada | ......................... | 382/274 |
| 5,805,738 A * | 9/1998 | Kaburagi et al. | ............. | 382/251 |
| 5,926,616 A * | 7/1999 | Sato et al. | ....................... | 358/1.2 |
| 6,078,410 A * | 6/2000 | Adachi | ......................... | 358/522 |
| 6,147,771 A * | 11/2000 | Washio | ........................ | 358/1.9 |
| 6,169,566 B1 * | 1/2001 | Katakura | ...................... | 347/240 |
| 6,222,950 B1 * | 4/2001 | Sugiura et al. | ................. | 358/1.9 |
| 6,466,335 B1 * | 10/2002 | Umezawa et al. | ............. | 358/1.9 |
| 7,043,089 B2 * | 5/2006 | Ballard | ......................... | 382/237 |
| 7,494,202 B2 * | 2/2009 | Sato | ................................ | 347/11 |
| 2003/0007024 A1 * | 1/2003 | Fujimori | ......................... | 347/15 |
| 2004/0252182 A1 * | 12/2004 | Wakasugi | ..................... | 347/251 |
| 2006/0061826 A1 * | 3/2006 | Miyasaka | ..................... | 358/3.13 |
| 2006/0187507 A1 * | 8/2006 | Konno et al. | ................. | 358/521 |
| 2006/0203310 A1 * | 9/2006 | Yamaguchi et al. | .......... | 358/509 |
| 2006/0232797 A1 * | 10/2006 | Hayaishi | ........................ | 358/1.9 |

FOREIGN PATENT DOCUMENTS

| | | |
|---|---|---|
| JP | 2-35313 | 2/1990 |
| JP | 3-73370 | 3/1991 |
| JP | 7-134647 | 5/1995 |
| JP | 09-136449 | 5/1997 |
| JP | 2001-136354 | 5/2001 |
| JP | 2005-022410 | 1/2005 |
| WO | WO 90/09890 | 9/1990 |

* cited by examiner

*Primary Examiner* — Dung Tran
(74) *Attorney, Agent, or Firm* — Rabin & Berdo, P.C.

(57) ABSTRACT

An image forming apparatus capable of realizing miniaturization of apparatus and low cost is supplied. In the image forming apparatus, an inputting section inputs gradation data values P with N bits; a gradation changing section changes the gradation data value P into a data set including $2^{(N-M)}$ (M<N) data with M bits; and a pixel forming section receives the data sets each includes $2^{(N-M)}$ (M<N) data with M bits according to an receiving order, forms dots whose energies are different on respective lines of M lines, and forms a gradation pixel of M bits.

10 Claims, 16 Drawing Sheets

| INPUT IMAGE DATA VALUE | EXPOSURE PATTERN DATA VALUE | | | | AVERAGE VALUE OF 4 GROUPS |
|---|---|---|---|---|---|
| | 0 | 1 | 2 | 3 | |
| 0 | 0000 | 0000 | 0000 | 0000 | 0.00 |
| 1 | 0000 | 0000 | 0000 | 0001 | 0.25 |
| 2 | 0000 | 0000 | 0001 | 0001 | 0.50 |
| 3 | 0000 | 0001 | 0001 | 0001 | 0.75 |
| 4 | 0001 | 0001 | 0001 | 0001 | 1.00 |
| 5 | 0001 | 0001 | 0001 | 0010 | 1.25 |
| 6 | 0001 | 0001 | 0010 | 0010 | 1.50 |
| 7 | 0001 | 0010 | 0010 | 0010 | 1.75 |
| 8 | 0010 | 0010 | 0010 | 0010 | 2.00 |
| ⋮ | ⋮ | ⋮ | ⋮ | ⋮ | ⋮ |
| 29 | 0111 | 0111 | 0111 | 1000 | 7.25 |
| ⋮ | ⋮ | ⋮ | ⋮ | ⋮ | ⋮ |
| 56 | 1110 | 1110 | 1110 | 1110 | 14.00 |
| 57 | 1110 | 1110 | 1110 | 1111 | 14.25 |
| 58 | 1110 | 1110 | 1111 | 1111 | 14.50 |
| 59 | 1110 | 1111 | 1111 | 1111 | 14.75 |
| 60 | 1111 | 1111 | 1111 | 1111 | 15.00 |
| 61 | 1111 | 1111 | 1111 | 1111 | 15.00 |
| 62 | 1111 | 1111 | 1111 | 1111 | 15.00 |
| 63 | 1111 | 1111 | 1111 | 1111 | 15.00 |

*FIG. 5*

| 2 BITS RANDOM NUMBERS | | INTEGRAL NUMBER WITH POSITIVE/NEGATIVE EXPRESSION | VALUE WITH DECIMAL EXPRESSION |
|---|---|---|---|
| 0 | 1 | 1 | 0.25 |
| 0 | 0 | 0 | 0 |
| 1 | 1 | -1 | -0.25 |
| 0 | 1 | 1 | 0.25 |
| 0 | 0 | 0 | 0 |
| 0 | 0 | 0 | 0 |
| 1 | 0 | -2 | -0.5 |
| 0 | 0 | 0 | 0 |
| 0 | 1 | 1 | 0.25 |
| 0 | 1 | 1 | 0.25 |
| 0 | 1 | 1 | 0.25 |
| 0 | 0 | 0 | 0 |
| 0 | 1 | 1 | 0.25 |
| 0 | 1 | 1 | 0.25 |
| 0 | 0 | 0 | 0 |
| 0 | 1 | 1 | 0.25 |
| 0 | 1 | 1 | 0.25 |
| 1 | 0 | -2 | -0.5 |
| 1 | 0 | -2 | -0.5 |
| 1 | 0 | -2 | -0.5 |
| 0 | 1 | 1 | 0.25 |
| 0 | 1 | 1 | 0.25 |
| 0 | 1 | 1 | 0.25 |
| 1 | 0 | -2 | -0.5 |
| 0 | 1 | 1 | 0.25 |
| 0 | 0 | 0 | 0 |
| 0 | 1 | 1 | 0.25 |
| 1 | 1 | -1 | -0.25 |
| 0 | 0 | 0 | 0 |
| 0 | 0 | 0 | 0 |
| 1 | 0 | -2 | -0.5 |
| 0 | 1 | 1 | 0.25 |
| 0 | 1 | 1 | 0.25 |
| 0 | 1 | 1 | 0.25 |
| 1 | 1 | -1 | -0.25 |
| 1 | 1 | -1 | -0.25 |
| 1 | 1 | -1 | -0.25 |
| 0 | 0 | 0 | 0 |

*FIG. 15*

|  |  | POSITIVE/NEGATIVE INTEGRAL NUMBER EXPRESSION | DECIMAL EXPRESSION |
|---|---|---|---|
| CASE 1 | | | |
| INPUT IMAGE DATA | 111001 | 57 | 14.25 |
| RANDOM NUMBER ⊕ | 11 | -1 | -0.25 |

(a) INTERNAL PROCESS OF ROUNDING ADDER

ADDITION WITH SIGN  111001
SIGN EXTENSION OF 2 BITS RANDOM NUMBERS  +111111

|  |  | POSITIVE/NEGATIVE INTEGRAL NUMBER EXPRESSION | DECIMAL EXPRESSION |
|---|---|---|---|
| CASE 2 | | | |
| INPUT IMAGE DATA | 111001 | 57 | 14.25 |
| RANDOM NUMBER ⊕ | 01 | 1 | 0.25 |

(b) INTERNAL PROCESS OF ROUNDING ADDER

ADDITION WITH SIGN  111001
SIGN EXTENSION OF 2 BITS RANDOM NUMBERS  +000001

111010  58  14.50
ROUNDING DECIMALS  + 0001

IMAGE FORMING APPARATUS

BACKGROUND OF THE INVENTION

1. Field of the Invention

The invention relates to an image forming apparatus of electronic photograph form, specially relates to an image forming apparatus capable of obtaining characteristic of high gradient through a subline control.

2. Related Background Art

In recent years, in image forming apparatus, in order to get an output image with high resolution, it is strongly required to realize high gradient. Further, it also is required to realize miniaturization of apparatus and low cost. For example, in patent document 1, in order to realize high gradient, such technology of the subline control is disclosed to drive a corresponding light source on/off several times through combining different time interval when forming one pixel.

Patent document 1: Japan patent publication H09-136449.

However, in the conventional technology stated above, with high gradient, a number of lines (subline) increases. As a result, there are such problems that circuit scale becomes large and it is impossible to realize the miniaturization of apparatus and the low cost.

SUMMARY OF THE INVENTION

It is, therefore, an object of the invention to provide an image forming apparatus capable of solving the above problem.

According to the present invention, there is provided an image forming apparatus comprising:

an inputting section for inputting gradation data values P with N bits;

a gradation changing section for changing the gradation data value P into a data set including $2^{(N-M)}$ (M<N) data with M bits; and a pixel forming section for receiving the data sets each includes $2^{(N-M)}$ (M<N) data with M bits according to an receiving order, forming dots whose energies are different on respective lines of M lines, and forming a gradation pixel of M bits.

Further, according to the present invention, there is also provided an image forming apparatus comprising:

an inputting section for inputting gradation data value P with N bits;

a random number generator gradation for generating pseudo random number of M bits;

a random numbers addition controlling section for adding the pseudo random number of M bits into the gradation data value P with N bits, and rounding a value of (N−M) bits; and a pixel forming section for receiving an output of the random numbers addition controlling section, forming dots whose energies are different on respective lines of (N−M) lines, and forming gradation pixel of (N−M) bits.

EFFECT OF THE PRESENT INVENTION

According to the present invention, because the image forming apparatus comprises a gradation changing section to change the gradation data value P of N bits into a data set including $2^{(N-M)}$ (N>M) data with M bits, then receives the data set according to an input order of the gradation data value P and respectively forms dots whose energies are different on respective lines of M lines, so it is unnecessary to increase the number of lines (subline) with the high gradient. As a result, it is possible to realize the miniaturization of apparatus and the low cost.

The above and other objects and features of the present invention will become apparent from the following detailed description and the appended claims with reference to the accompanying drawings.

BRIEF DESCRIPTION OF THE DRAWINGS

FIG. 5 is an explanation diagram of exposure pattern lookup table;

FIG. 15 is an explanation diagram of linear feedback shift register;

FIG. 16A is a first explanation diagram of rounding adder;

FIG. 16B is a second explanation diagram of rounding adder; and

DETAILED DESCRIPTION OF THE PREFERRED EMBODIMENTS

Embodiments of the invention will be described in detail hereinbelow with reference to the drawings.

Embodiment 1

Firstly, as an example of an image forming apparatus in which the present invention is applied, a printer of electronic photograph is explained.

Figure 1:
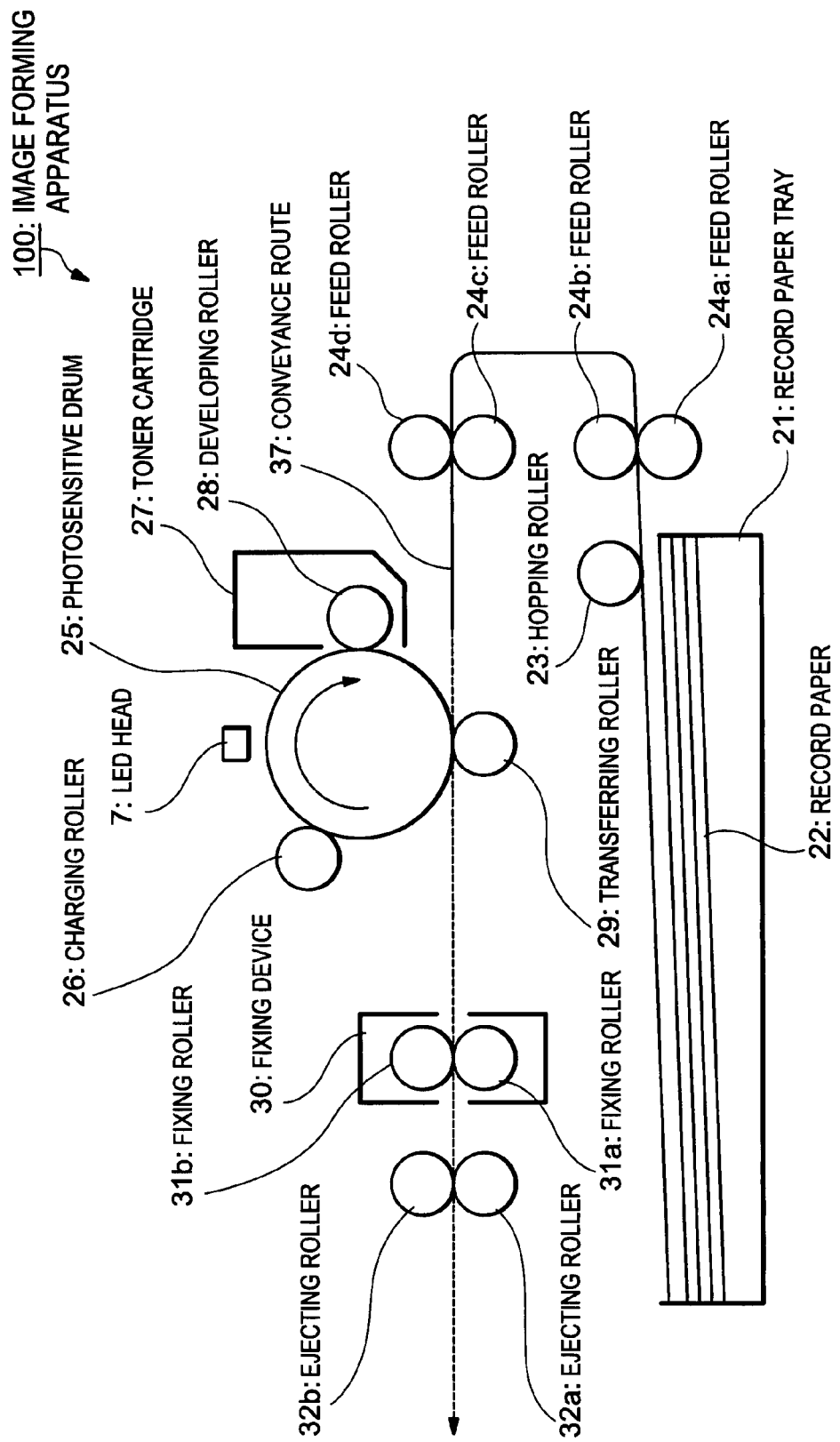
FIG. 1 is a summary cross section showing a structure of image forming apparatus.

FIG. 1 is a summary cross section showing a structure of image forming apparatus.

As shown by the FIG. 1, a record paper tray 21 is a cassette to accumulate record paper 22. A hopping roller 23 is a roller to separate the accumulated record papers 22 one by one and provide the record paper 22. Feed rollers 24*a*, 24*b*, 24*c* and 24*d* are rollers to feed the separated and provided record paper 22 to a conveyance route 37. A photosensitive drum 25 is a part to sequentially execute respective processes of charging, exposing, developing and transferring, while rotating along an arrow direction.

Here, the charging process is to charge the surface of the photosensitive drum 25 with minus electric charge through a charging roller 26; the exposing process is to expose the surface of the photosensitive drum 25 on which minus electric charge is charged, on the basis of predetermined print data through a LED head 7, through the exposing process, an electrostatic latent image is formed on the surface of the photosensitive drum 25; the developing process is to form a toner image through that a developing roller 28 supplies toner accommodated in a toner cartridge 27 to the electrostatic latent image on the surface of the photosensitive drum 25; the transferring process is to transfer the toner image formed on the surface of the photosensitive drum 25 onto the record paper 22 through adding a plus high-electric field from the reverse side (under side of the drawing) of the record paper 22 conveyed on the conveyance route 37, by a transferring roller 29.

A fixing device 30 is a part to heat-fix the toner image onto the record paper 22 through fixing rollers 31a and 31b. Ejecting rollers 32a and 32b are rollers to eject the record paper 22 to an ejection cassette (not shown). In such structure explained above, a subline control of the present invention is executed by a controlling system that will be explained below.

The following is to first explain a summary of the subline control, second explain a detail function of the subline control executed in the embodiment together with the controlling system of the embodiment.

Figure 2:
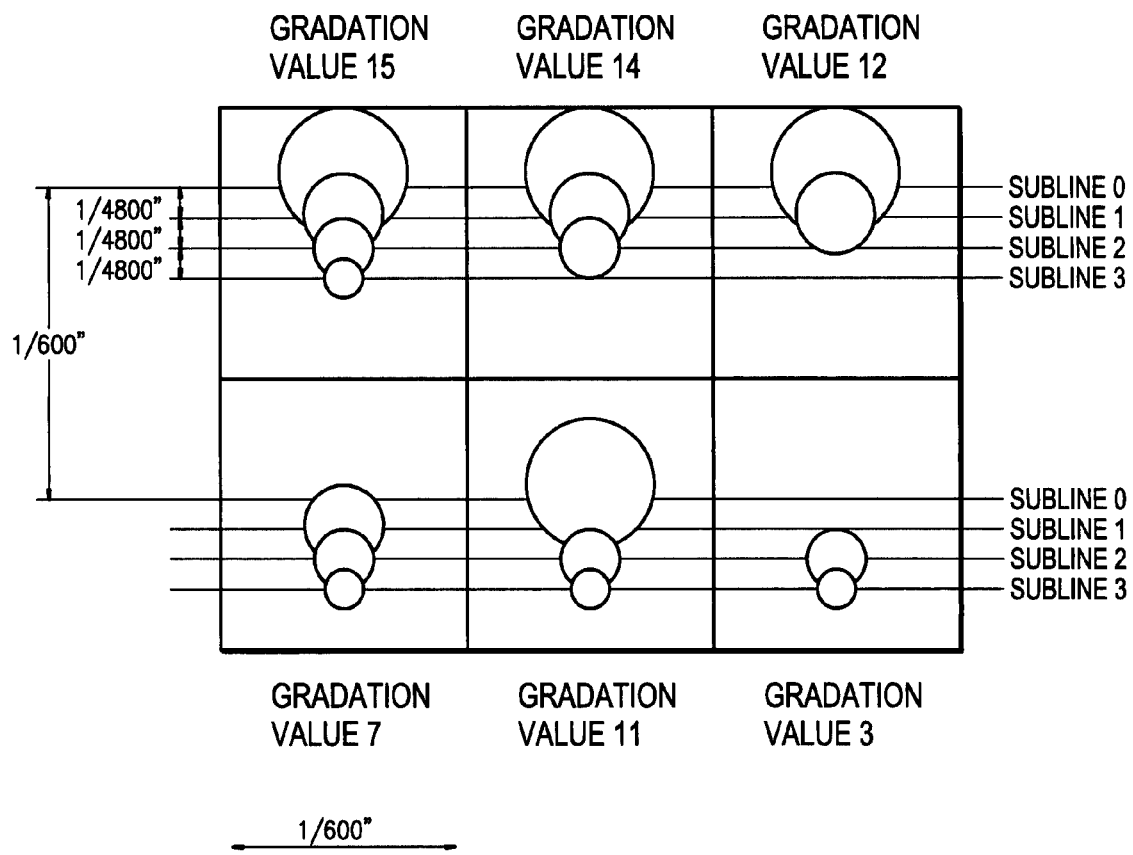
FIG. 2 is an explanation diagram of subline control.

FIG. 2 is an explanation diagram of subline control.

The drawing is a concept diagram to represent input image data with 4 bits to gradation representation on 4 sublines. A part enclosed by a rectangle in drawing shows a pixel of 1/600 inch×1/600 inch. When LED head passes each pixel, there are 4 timings. At respective timings, subdots are formed through exposure on the basis of the input image data. A circle in drawing shows a composition of corresponding subdots, a sum total of exposure energies in exposure positions of respective subdots becomes dot energy of one pixel.

As shown by FIG. 2, one gradation data value per pixel is represented by a combination of subdots that lengthwise arrange in one pixel and have respective exposure energies different from each other. The energy quantities of respective sublines are binary weight, and through a combination of lighting lamp of 4 sublines, $2^4$ ways of gradation representations become possible. In the case, because the kinds of exposure energies in one pixel and their orders are identically set with respect to all pixels, the subdots arranging in main scanning direction may have common exposure energy and exposure time, and gradation print becomes easy with respect to LED head to drive a great many LED elements.

Figure 3:
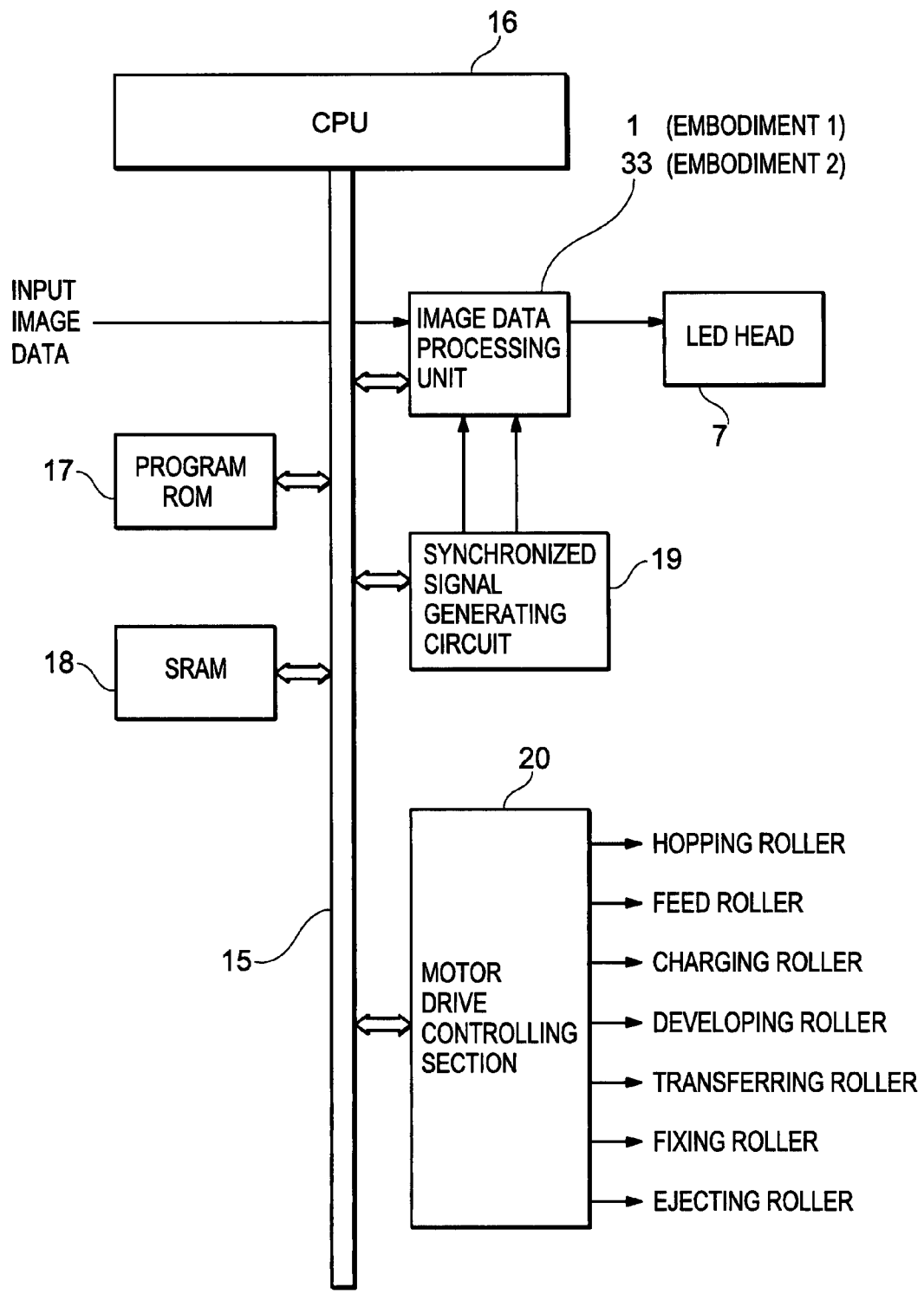
FIG. 3 is a block diagram showing a controlling system of image forming apparatus.

FIG. 3 is a block diagram showing a controlling system of image forming apparatus.

As show by FIG. 3, a controlling system of image forming apparatus 100 (FIG. 1) comprises a image data processing unit 1 (it is 33 in embodiment 2), a common bus 15, a CPU 16, a program ROM 17, a SRAM 18, a synchronized signal generating circuit 19 and a motor drive controlling section 20.

The image data processing unit 1 is a part to realize high gradient of image information through receiving input image data with 6 bits and making the LED head 7 light lamp most 4 times. Next, it will be explained in detail.

Figure 4:
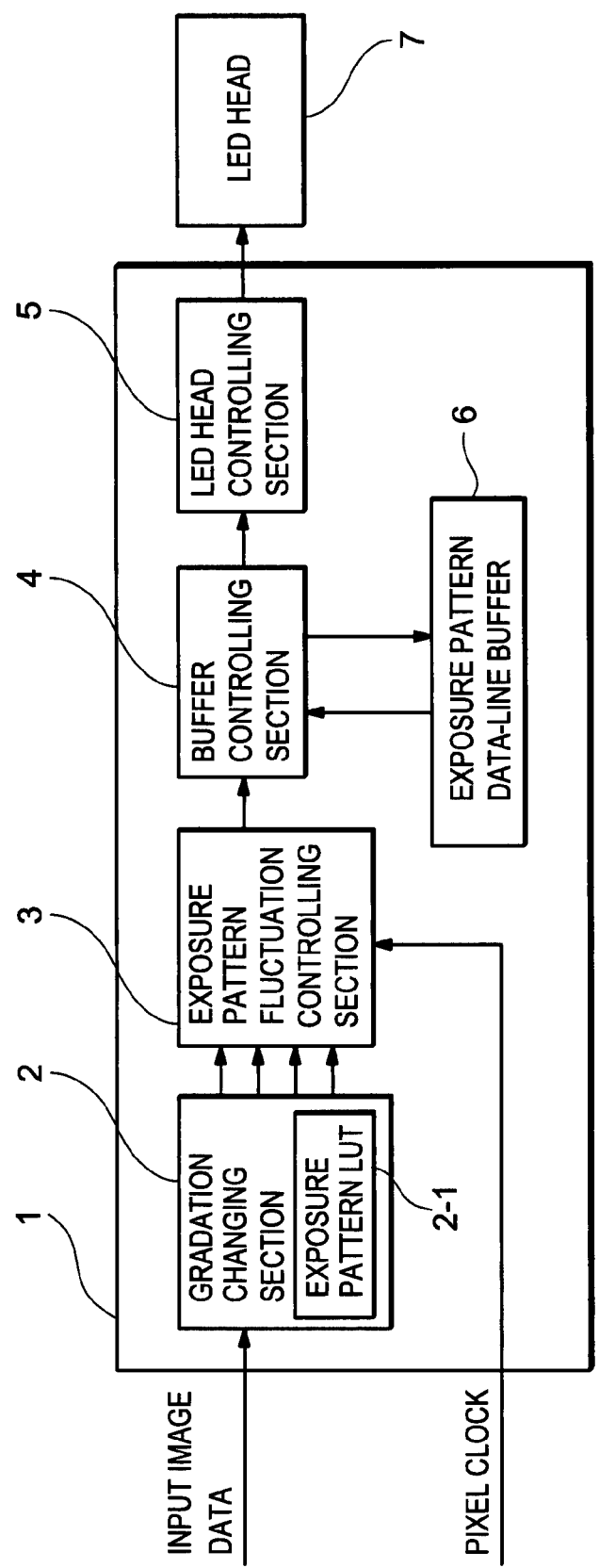
FIG. 4 is a block diagram showing a structure of image data processing unit in embodiment 1.

FIG. 4 is a block diagram showing a structure of image data processing unit in embodiment 1.

As shown by FIG. 4, the image data processing unit 1 in embodiment 1 includes a gradation changing section 2, an exposure pattern fluctuation controlling section 3, a buffer controlling section 4, a LED head controlling section 5 and an exposure pattern data-line buffer 6.

The gradation changing section 2 is a part that has a exposure pattern LUT 2-1 in its inside; makes the input image data with 6 bits sent from a host apparatus (not shown) serve as an address; outputs exposure pattern data value of 4 bits from a table stored in the exposure pattern LUT 2-1 and in which 4 data serve as one set and each data of 4 bits serves as one group; and changes the input image data with 6 bits into a set including 4 data with 4 bits. Next, its detail content is explained.

FIG. 5 is an explanation diagram of exposure pattern lookup table.

As shown by FIG. 5, on most left in drawing, the input image data with 6 bits (decimal expression) are shown in order from upper side. On center row in drawing, the exposure pattern data values to correspond to respective input image data values are shown. On most right in drawing, respective average values (each value is equal to a value obtained through dividing the input image data value by 4) are shown. Therefore, the sum total of the exposure pattern data values (binary expression) in one set is previously set to be equal to the corresponding input image data value through a conversion of decimal expression, and the average value is previously set to be equal to a value obtained through dividing the input image data value (decimal expression) by 4. However, when the input image data value is 60 or over, the input image data value reaches the highest limit. Because the limit value 60 or over corresponds to a high density area of a printed image, and a density difference is almost not visible, so there is no problem.

The exposure pattern fluctuation controlling section 3 shown by FIG. 4 is a part to receive 4 exposure pattern data values serving as 4 groups in one set from the gradation changing section 2, to correspond to the input image data value; and sequentially select one from the 4 exposure pattern data values one by one. Next, its detail content is explained.

Figure 6:
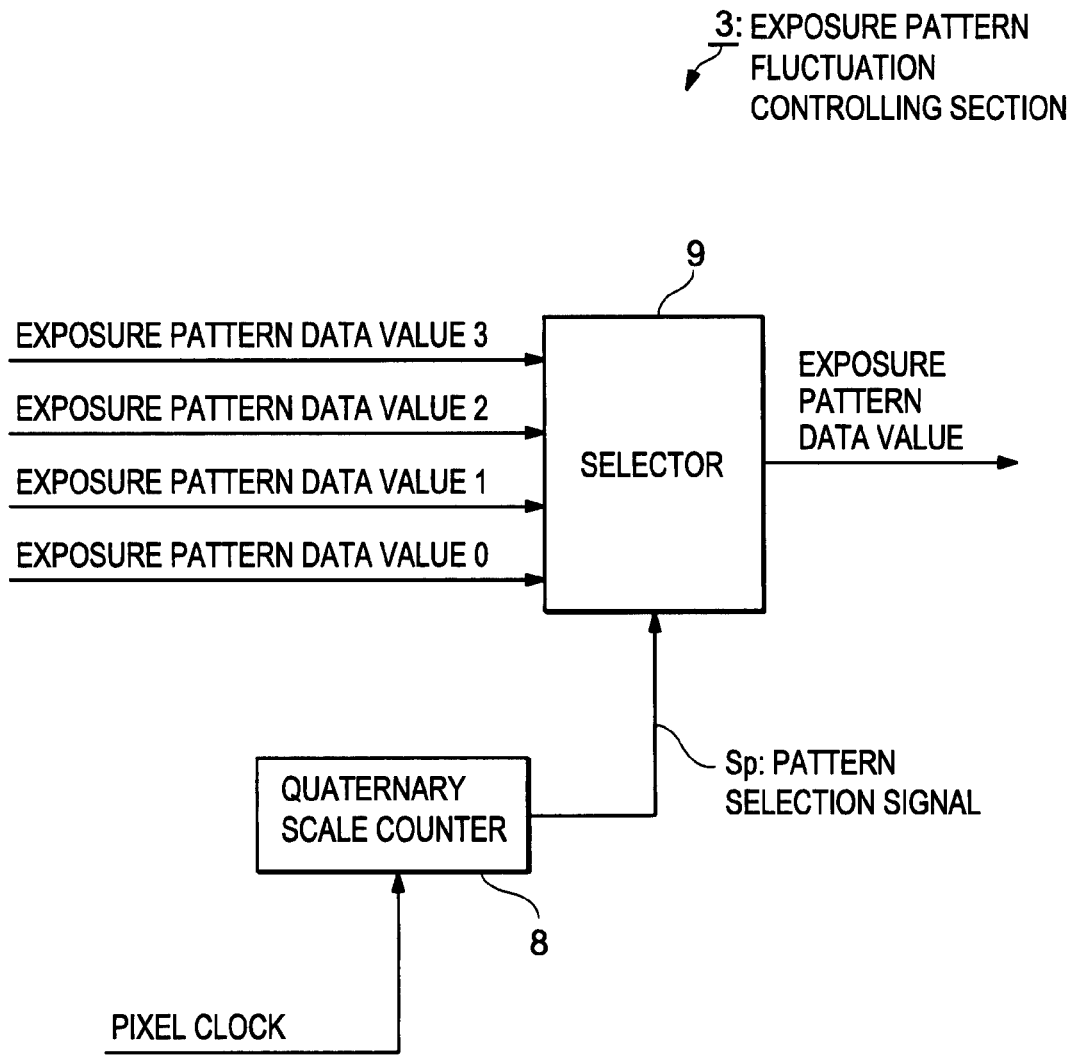
FIG. 6 is an explanation diagram of exposure pattern fluctuation controlling section.

FIG. 6 is an explanation diagram of exposure pattern fluctuation controlling section.

As shown by FIG. 6, the exposure pattern fluctuation controlling section 3 has a quaternary scale counter 8 and a selector 9. The quaternary scale counter 8 is a part to perform an increment with respect to a pattern selection signal Sp through synchronizing with a pixel clock received from a host apparatus (not shown). The selector 9 is a part to receive the pattern selection signal Sp, select the corresponding exposure pattern data value (exposure pattern data value 0, 1, 2, or 3) and send it to the buffer controlling section 4.

The buffer controlling section 4 shown by FIG. 4 is a part to receive the exposure pattern data value from the exposure pattern fluctuation controlling section 3, temporarily buffer the exposure pattern data value and send a binary head data converted into a predetermined format to the LED head controlling section 5 at a predetermined timing. Next, its detail content is explained.

Figure 7:
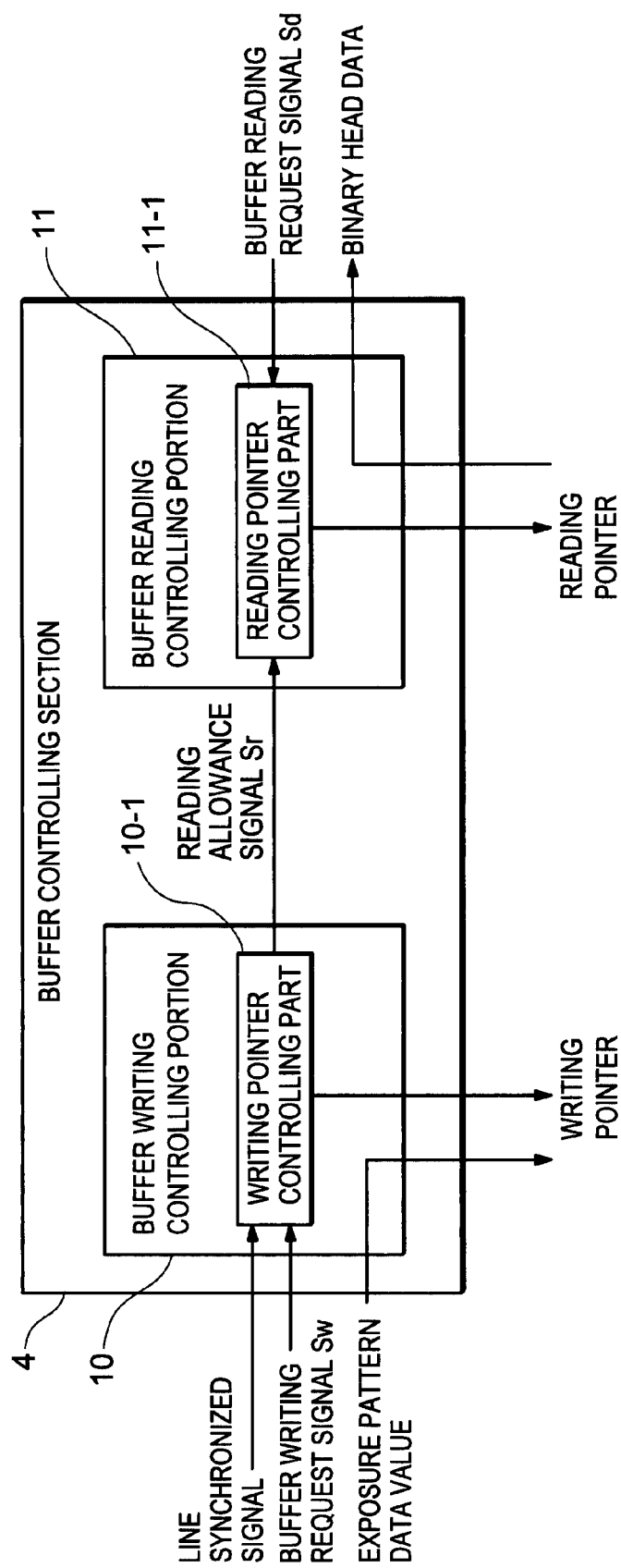
FIG. 7 is an explanation diagram of buffer controlling section.
Figure 8:
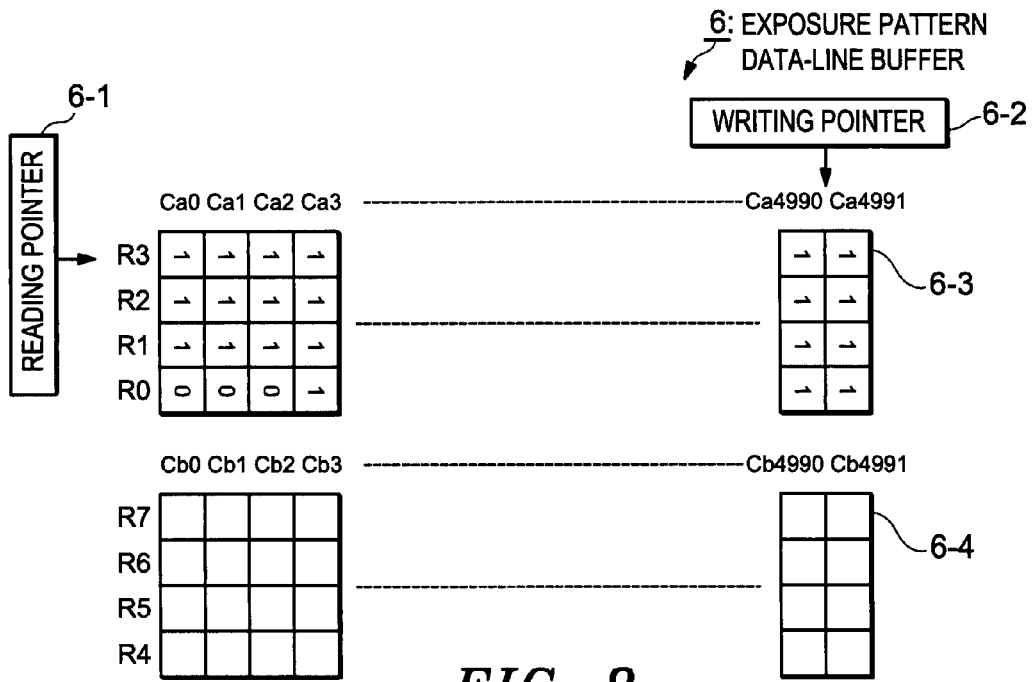
FIG. 8 is an explanation diagram of exposure pattern dataline buffer.

FIG. 7 is an explanation diagram of buffer controlling section; and FIG. 8 is an explanation diagram of exposure pattern data-line buffer.

As shown by FIG. 7, the buffer controlling section 4 has a buffer writing controlling portion 10 and a buffer reading controlling portion 11. As shown by FIG. 8, the exposure pattern data-line buffer 6 contains a line buffer 6-3 having row addresses R0, R1, R2 and R3 and column addresses Ca0~Ca4991; a line buffer 6-4 having row addresses R4, R5, R6 and R7 and column addresses Cb0~Cb4991; a reading pointer 6-1 and a writing pointer 6-2.

On the one hand, the buffer writing controlling portion 10 (FIG. 7) is a part to alternatively reset the writing pointer 6-2 (FIG. 8) to point to the Ca0 on the left side of the line buffer 6-3 or to point to the Cb0 on the left side of the line buffer 6-4 whenever line synchronized signal comes, move (i.e. to perform an increment) the writing pointer 6-2 one by one along a rightward direction in drawing whenever buffer writing signal comes; and perform a writing control to write the received exposure pattern data value into the exposure pattern data-line buffer 6. Here, the writing pointer 6-2 (FIG. 8) is used for pointing to the column address of the line buffer 6-3 or the line buffer 6-4, the column addresses respectively correspond to LED elements whose total number is 4992 and that are carried on the LED head 7 (FIG. 4).

Further, the exposure pattern data-line buffer 6 has two series of line buffers of the line buffer 6-3 with the column addresses Ca0~Ca4991 and the line buffer 6-4 with the column addresses Cb0~Cb4991, through alternatively using the line buffer 6-3 and the line buffer 6-4, it is possible to simultaneously perform writing operation and reading operation. At every line, the receiving of the last exposure pattern data value is performed when received a buffer writing request signal SW in a state that the writing pointer 6-2 (FIG. 8) is pointing to the column address Ca4991 or the column address Cb4991. At that tame, a writing pointer controlling part 10-1 (FIG. 7) sends a reading allowance signal Sr to the buffer reading controlling portion 11.

On the other hand, the buffer reading controlling portion 11 (FIG. 7) is a part to alternatively reset the reading pointer 6-1 (FIG. 8) to point to the row address R3 or R7 whenever the reading allowance signal Sr comes from the buffer writing controlling portion 10 (FIG. 7), downward move (i.e. to perform an increment) the reading pointer 6-1 one by one whenever a buffer reading request signal Sd comes; and perform a control of address of the exposure pattern data value to be read. As stated above, the buffer controlling section 4 (FIG. 4) sends a binary head data to the LED head controlling section 5 (FIG. 4) while performing a format conversion of exposure pattern.

The LED head controlling section 5 shown by FIG. 4, is a part to receive a binary head data Dh from the buffer controlling section 4, temporarily hold the binary head data Dh and send the binary head data Dh to the LED head 7 at a predetermined timing as a head drive data Sh. Next, its detail content is explained.

Figure 9:
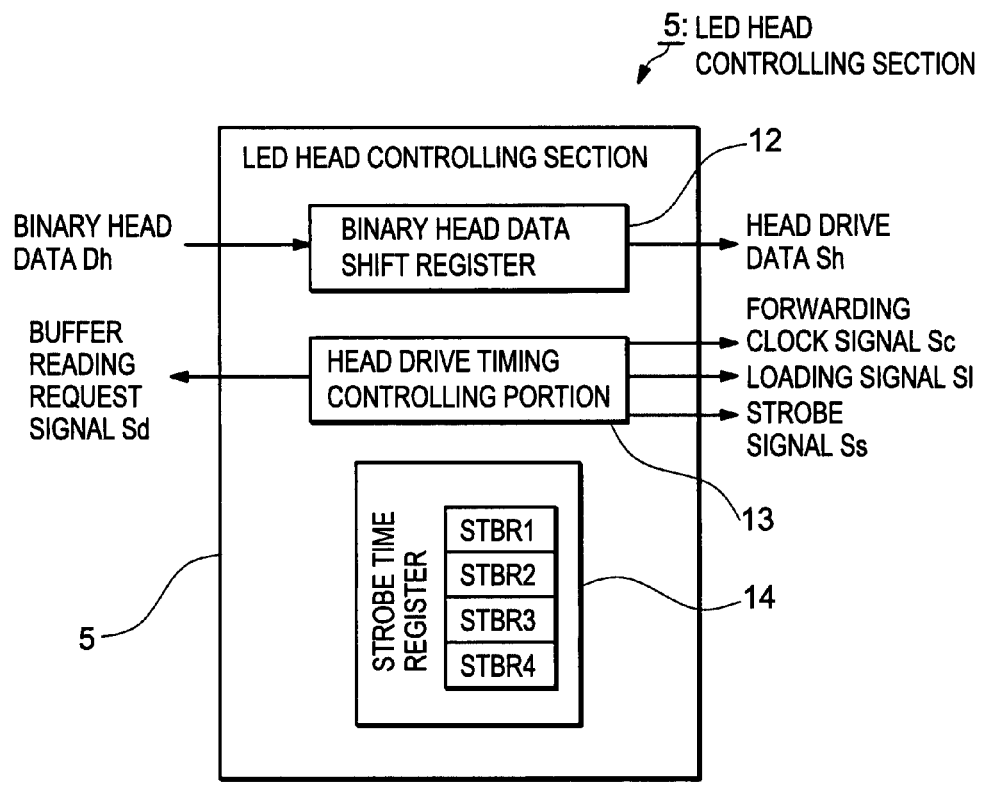
FIG. 9 is an explanation diagram of LED head controlling section.

FIG. 9 is an explanation diagram of LED head controlling section.

As shown by FIG. 9, the LED head controlling section 5 has a binary head data shift register 12, a head drive timing controlling portion 13 and a strobe time register 14.

The binary head data shift register 12 is a part to receive the binary head data Dh from the buffer controlling section 4 (FIG. 7) and hold it. The head drive timing controlling portion 13 is a part to send the binary head data Dh held in the binary head data shift register 12 to the LED head 7 (FIG. 4) at a predetermined timing as a head drive data Sh; also is a part to send a forwarding clock signal Sc, a loading signal Sl and a strobe signal Ss to the LED head 7 together with sending a buffer reading request signal Sd to the buffer controlling section 4 (FIG. 4). The strobe time register 14 is a part to prescribe a pulse width of the strobe signal Ss.

Figure 13:
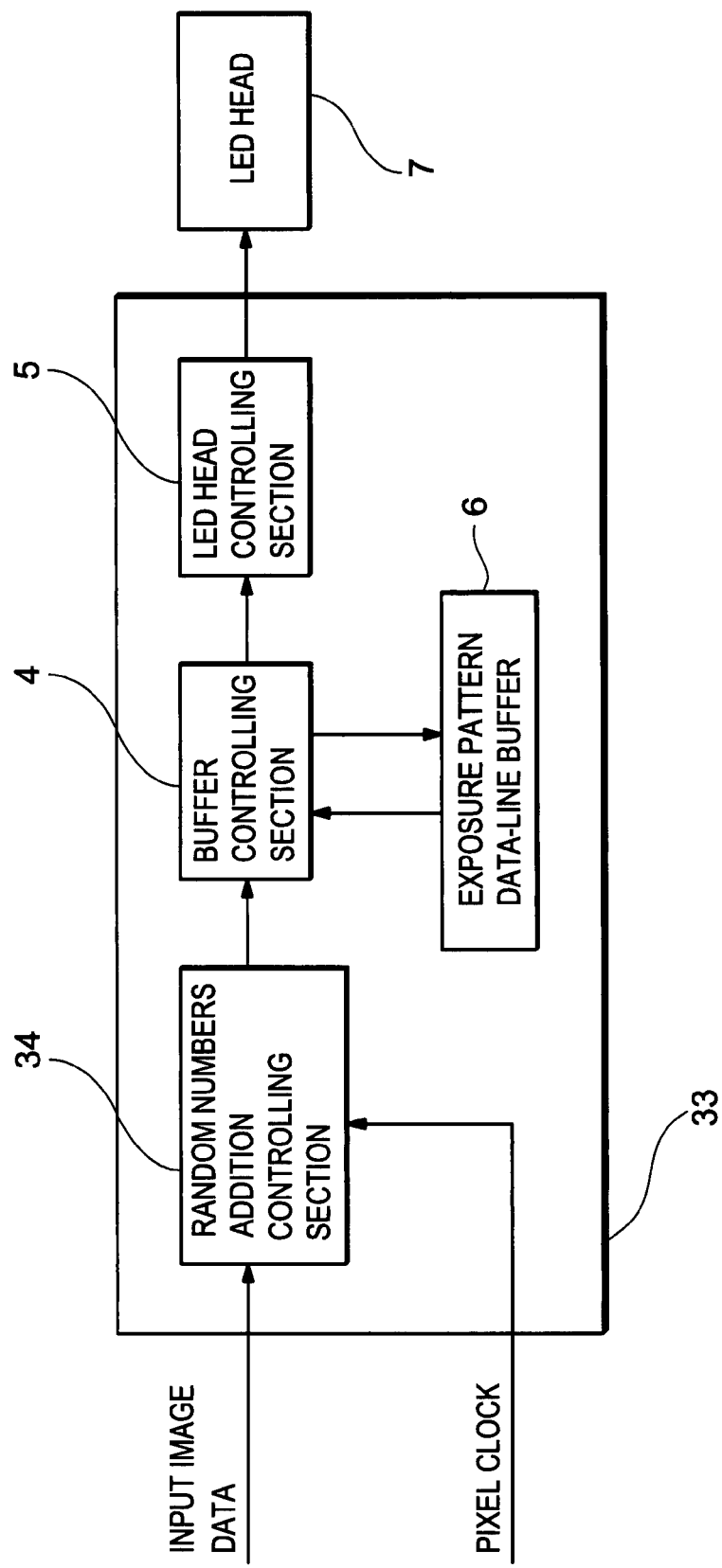
FIG. 13 is a block diagram showing a structure of image data processing unit in embodiment 2.

The CPU 16 shown by FIG. 13 is a micro processor to control whole apparatus through executing predetermined program previously stored in the program ROM 17. The program ROM 17 is a read only memory to previously store necessary control program for controlling the whole apparatus and control data (the exposure pattern LUT 2-1 and the like stated above). The SRAM 18 is a random access memory to provide necessary calculation area in the process that the CPU 16 executes the control program. The synchronized signal generating circuit 19 is a circuit to generate synchronized signals (pixel clock signal, line synchronized signal and the like) serving as standard of operation of the whole apparatus. The motor drive controlling section 20 is a part to control the respective parts (FIG. 1) of on the basis of a control of the CPU 16. The common bus 15 is a signal path to connect the respective compositions.

The image data processing unit 1 (FIG. 4) in the embodiment 1 operates as follows.

Figure 10:
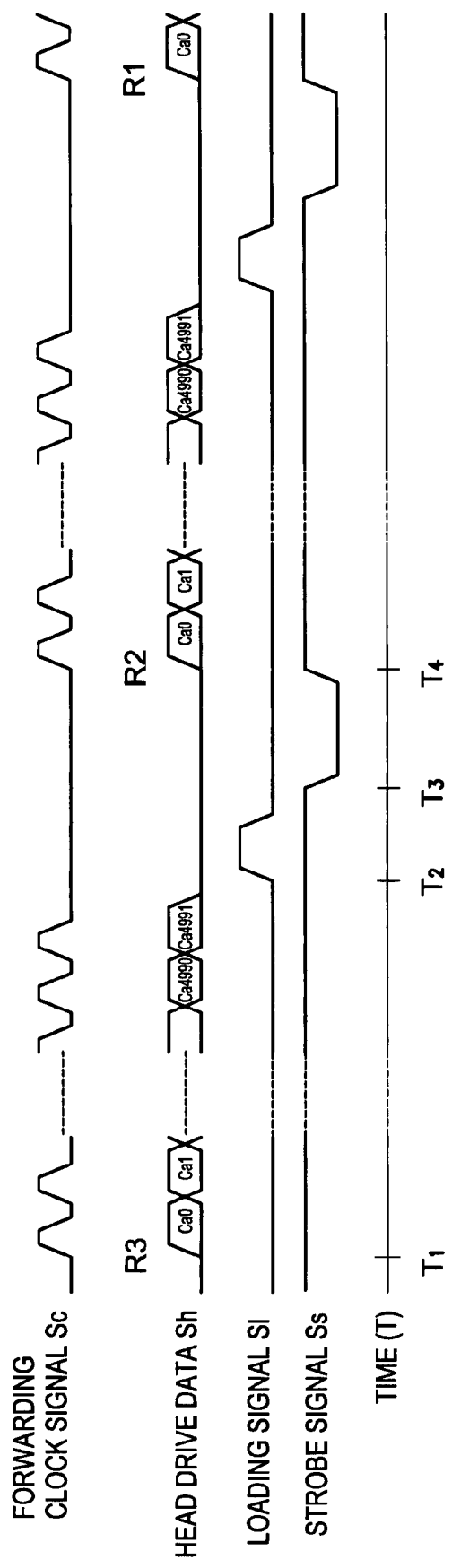
FIG. 10 is a first time chart showing signals output from LED head controlling section.

FIG. 10 is a first time chart showing signals output from LED head controlling section.

In the drawing, from the upper side to the underside, respective waveform traces of the forwarding clock signal Sc, the head drive data Sh, the loading signal Sl and the strobe signal Ss are shown; on the most under side, a time passage axis (T) used for respective signals and data in common is shown. The following is to explain operations (output of signal/data) of the image data processing unit 1 (FIG. 4) according to a time order.

Time T1

A forwarding of the head drive data Sh is started to synchronize with the forwarding clock signal Sc from the LED head controlling section 5 (FIG. 9) to the LED head 7 (FIG. 4).

Time T2

After all head drive data Sh (FIG. 9) corresponding to the row address R3 (FIG. 8) of the line buffer 6-3 are forwarded from the binary head data shift register 12 (FIG. 9), the loading signal Sl is sent from the LED head controlling section 5 (FIG. 9) to the LED head 7, and the all head drive data Sh are respectively loaded to corresponding LED elements.

Time T3

The strobe signal Ss whose pulse width is set by the strobe time register 14 is sent from the LED head controlling section 5 to the corresponding LED element, and the LED element starts to expose.

Time T4

The strobe signal Ss is stopped to send and the LED element stops to expose. After that, a forwarding of the head drive data Sh (FIG. 9) corresponding to the row address R2 (FIG. 8) of the line buffer 6-3 from the LED head controlling section 5 (FIG. 9) to the LED head 7 to synchronize with the forwarding clock signal Sc.

Then, the operations from the time T1 to the time T4 are repeated.

Figure 11:
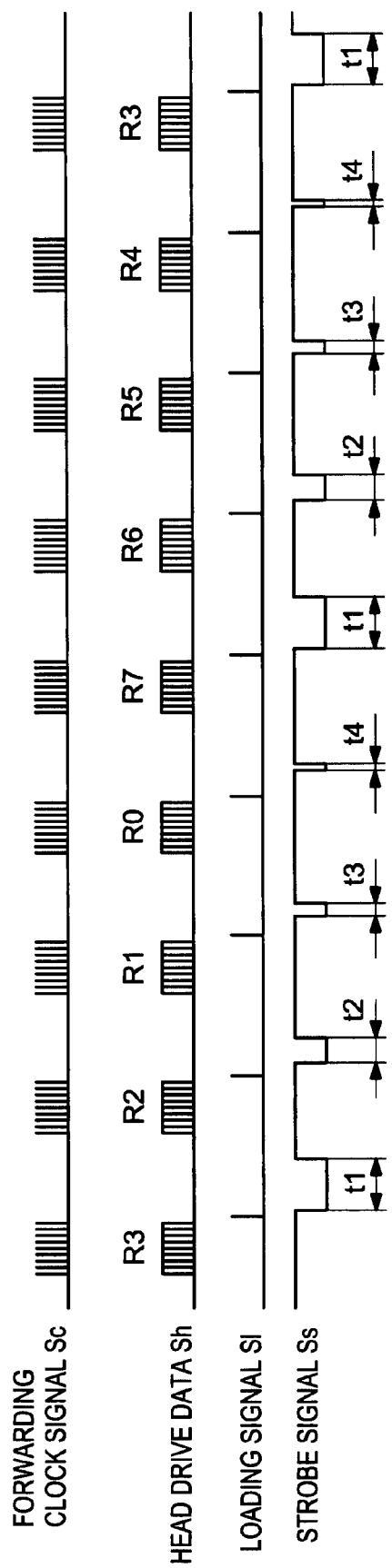
FIG. 11 is a second time chart showing signals output from LED head controlling section.

FIG. 11 is a second time chart showing signals output from LED head controlling section.

In the drawing, from the upper side to the underside, respective waveform traces of the forwarding clock signal Sc, the head drive data Sh, the loading signal Sl and the strobe signal Ss are shown; The time chart uses time longer than that in FIG. 10. As shown by FIG. 11, 4 ways of pulse widths (t1~t4) of the strobe signal Ss are outputted to correspond to the row addresses (R3~R0, R7~R4) of the line buffer 6-3.

Figure 12:
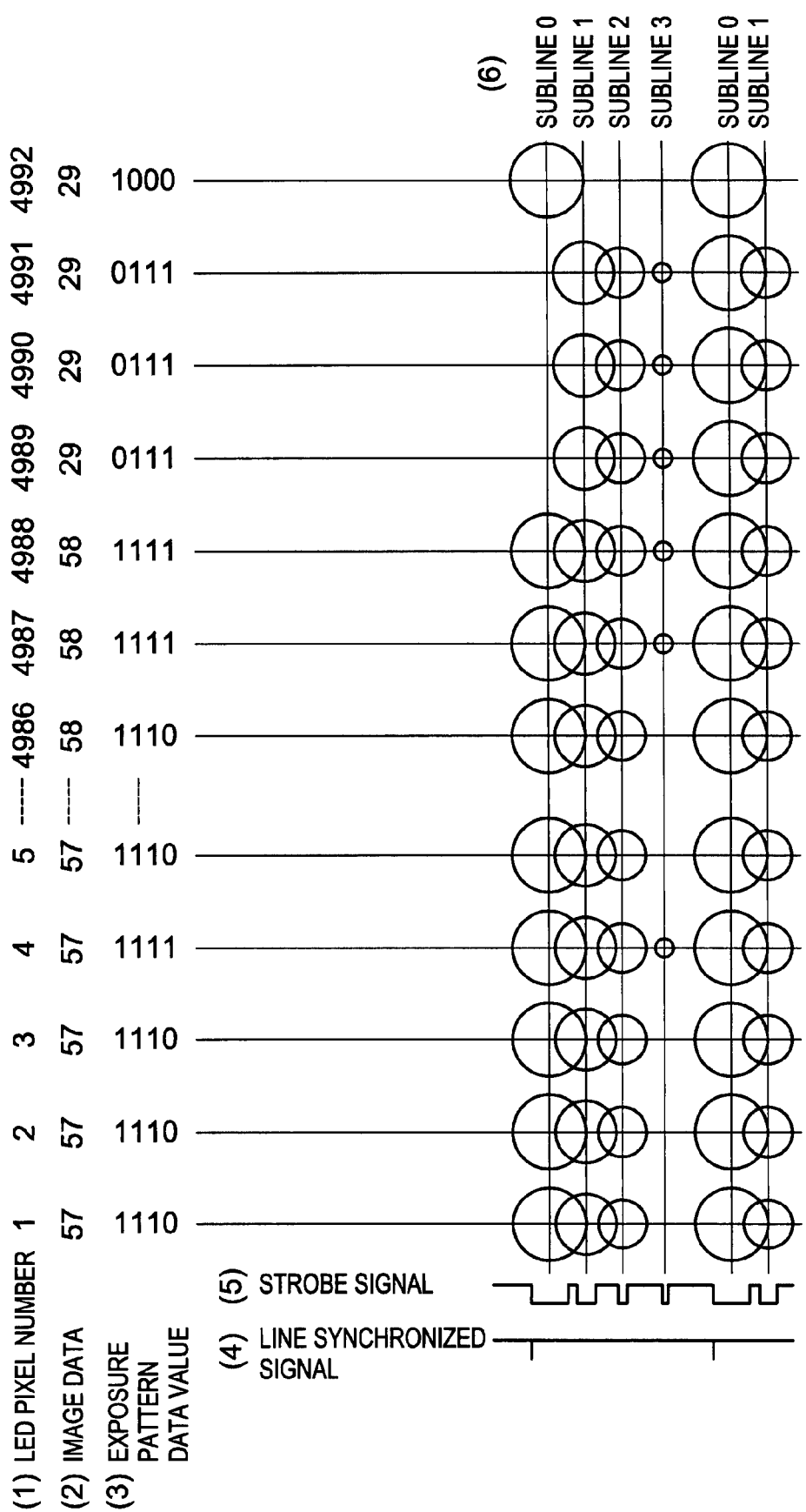
FIG. 12 is a relation diagram of exposure pattern and respective signals in embodiment 1.

FIG. 12 is a relation diagram of exposure pattern and respective signals in embodiment 1.

The drawing represents a relation between exposure pattern generated on the basis of the subline control stated above and respective signals. In an X axis direction (main scanning direction), on the most upper side, LED pixel numbers ("(1)") 1~4992 are shown; to correspond to the LED pixel numbers, image data ("(2)", one example) are respectively shown; to correspond to the image data, exposure pattern data values ("(3)", binary expression) are respectively shown. Further, in a Y axis direction (subsidiary scanning direction), line synchronized signal waveform ("(4)"), strobe signal waveform ("(5)") and subline number are shown. As shown by FIG. 12, according to the image data, the photosensitive drum 25 is exposed through driving the LED element on/off most 4 times on the basis of the different strobe signal time. Here, the size of exposure energy is represented by a diameter of exposure pattern corresponding to the pulse width of the strobe signal Ss, on 4 sublines, respective exposures are performed.

According to the embodiment 1, because the image forming apparatus 100 the image forming apparatus comprises a gradation changing section 2 to receive an input image data value with 6 bits and change the input image data value into a data set including 4 data with 4 bits, then receives the data set according to a receiving order of the input image data value and respectively forms dots whose energies are different on respective lines of 4 lines, so it is unnecessary to increase the number of lines (subline) with the high gradient. As a result, it is possible to realize the miniaturization of apparatus and the low cost.

Moreover, in the embodiment, when receiving the input image data value with 6 bits and forming the dots whose energies are different on 4 lines (sublines), the data set including $2^{(6-4)}$ data with 4 bits is used and 64 gradations are represented. Likewise, also it is possible to represent 64 gradation through forming dots whose energies are different on, for example, 3 lines (sublines) and using a data set including $2^{(6-3)}$ data with 3 bits.

Embodiment 2

FIG. 13 is a block diagram showing a structure of image data processing unit in embodiment 2.

As shown by FIG. 13, the image data processing unit 33 in embodiment 2 includes a random numbers addition controlling section 34, a buffer controlling section 4, a LED head controlling section 5 and an exposure pattern data-line buffer 6. The following is to only explain the different parts from the embodiment 1, moreover, regarding the same parts as the embodiment 1, their symbols are identically set and their explanations are omitted.

The random numbers addition controlling section 34 is a part to generate random number of 2 bits, convert the random number of 2 bits into an integral number with positive/negative expression, add a decimal obtained through dividing the integral number with positive/negative expression by 4 into an input image data, round an addition result and output it. Next, its detail content is explained.

Figure 14:
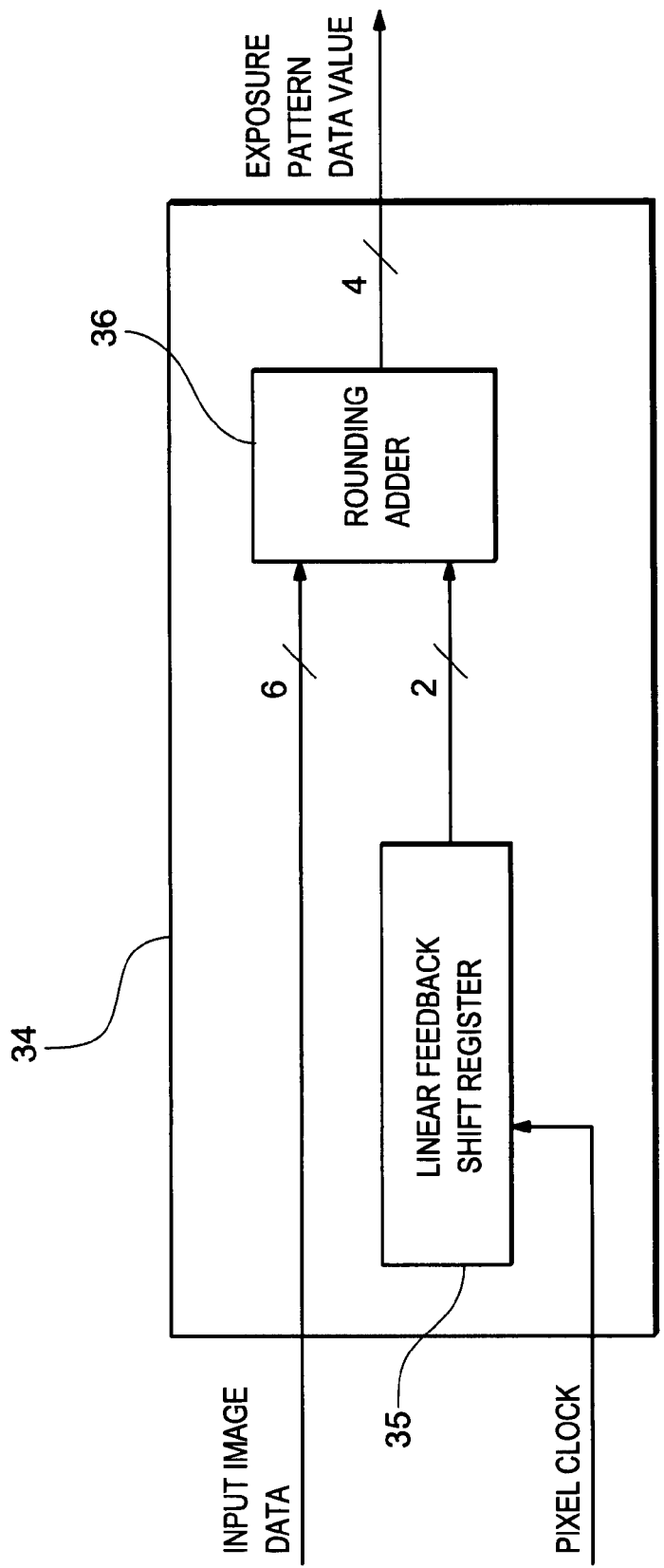
FIG. 14 is an explanation diagram of random numbers addition controlling section.

FIG. 14 is an explanation diagram of random numbers addition controlling section.

As shown by FIG. 14, the random numbers addition controlling section 34 has a linear feedback shift register 35 and a rounding adder 36. The linear feedback shift register 35 is a part to sequentially convert a random number values expressed by a characteristic polynomial $X^{16}=1+X+X^3+X^{12}$ into integral numbers with positive/negative expression from a state having loaded an initial value of 2071 (hexadecimal number); and output respective decimals obtained through respectively dividing the integral numbers with positive/negative expression by 4. Next, its detail content is explained.

FIG. 15 is an explanation diagram of linear feedback shift register.

On the first row and second row of the left side in drawing, random numbers with 2 bits sequentially occurring from a state having loaded the initial value of 2071 (hexadecimal number) expressed by a characteristic polynomial $X^{16}=1+X+X^3+X^{12}$ are shown. On the third row, the integral numbers with positive/negative expression are shown. When the random numbers with 2 bits is "01", the integral number with positive/negative expression is "1"; when the random numbers with 2 bits is "00", the integral number with positive/negative expression is "0"; when the random numbers with 2 bits is "11", the integral number with positive/negative expression is "−1". On the fourth row, the respective values with decimal expression obtained through respectively dividing the integral numbers with positive/negative expression by 4 are shown. As an example, on first line, the random number with 2 bits is "01", the integral number with positive/negative expression is "1", and the value with decimal expression is "0.25" through dividing the integral number with positive/negative expression "1" by 4. Likewise, on the second line, the random number with 2 bits is "00", the integral number with positive/negative expression is "0", and the value with decimal expression is "0" through dividing the integral number with positive/negative expression "0" by 4. Likewise, on the third line, the random number with 2 bits is "11", the integral number with positive/negative expression is "−1", and the value with decimal expression is "−0.25" through dividing the integral number with positive/negative expression "−1" by 4. The others are obtained according to the same calculation rule.

The rounding adder 36 shown by FIG. 14 is a part to receive an input image data with 6 bits from a host apparatus and receive the value with decimal expression from the linear feedback shift register 35 through synchronizing with the pixel clock, then add the value with decimal expression into the input image data with 6 bits, further round the addition result, finally output an exposure pattern data value of 4 bits. Next, its detail content is explained.

FIG. 16A is a first explanation diagram of rounding adder; and FIG. 16B is a second explanation diagram of rounding adder.

When apparatus stands up, the initial value of 2071 (hexadecimal number) is loaded. After the input image data with 6 bits is inputted from a host apparatus by synchronizing with the pixel clock, the linear feedback shift register 35 performs an update according to the pixel clock and outputs a random numbers with 2 bits of "00" (the second line in FIG. 15) and the input image data value is added by the rounding adder 36 (FIG. 14). Then, the upper 4 bits is outputted as an exposure pattern data value.

In the case that the input image data value is "57" and its binary expression of 6 bits is "111001", because the random number with 2 bits is "00" and the value with decimal expression is "0" (the second line in FIG. 15), so the upper 4 bits are "1110" as an exposure pattern data value and it is outputted. Continuously, as an example, an input image data value of "57" is inputted and an update is performed by a random numbers of "11", in the case, the value with decimal expression is "−0.25" (the third line in FIG. 15). As shown by FIG. 16A, after adding the random number with 2 bits into the input image data value and rounding the addition result, the upper 4 bits of "1110" are outputted as an exposure pattern data value.

Further, as an example, an input image data value of "57" is inputted and an update is performed by a random numbers of "01", in the case, the value with decimal expression is "0.25" (the fourth line in FIG. 15). As shown by FIG. 16B, after adding the random number with 2 bits into the input image data value and rounding the addition result, the upper 4 bits of "1111" are outputted as an exposure pattern data value.

Furthermore, as an example, an input image data value of "57" whose binary expression of 6 bits is "111001" is inputted and an update is performed by a random numbers of "00", in the case, the value with decimal expression is "0" (the fifth line in FIG. 15). As shown by FIG. 16B, after adding the random number with 2 bits into the input image data value and rounding the addition result, the upper 4 bits of "1110" are outputted as an exposure pattern data value.

As explained above, even if the input image data values are identical, because the random numbers with 2 bits generated in the random numbers addition controlling section 34 are different from, different exposure pattern data values are outputted. In the case stated above, an average value of exposure energies represented by the 4 exposure pattern data values is 14.25 through (1110+1110+1111+1110)/4. The average value corresponds to a quarter of the input image data value of "57".

Regarding other functions, because they are the same as that in embodiment 1, their explanations are omitted.

Figure 17:
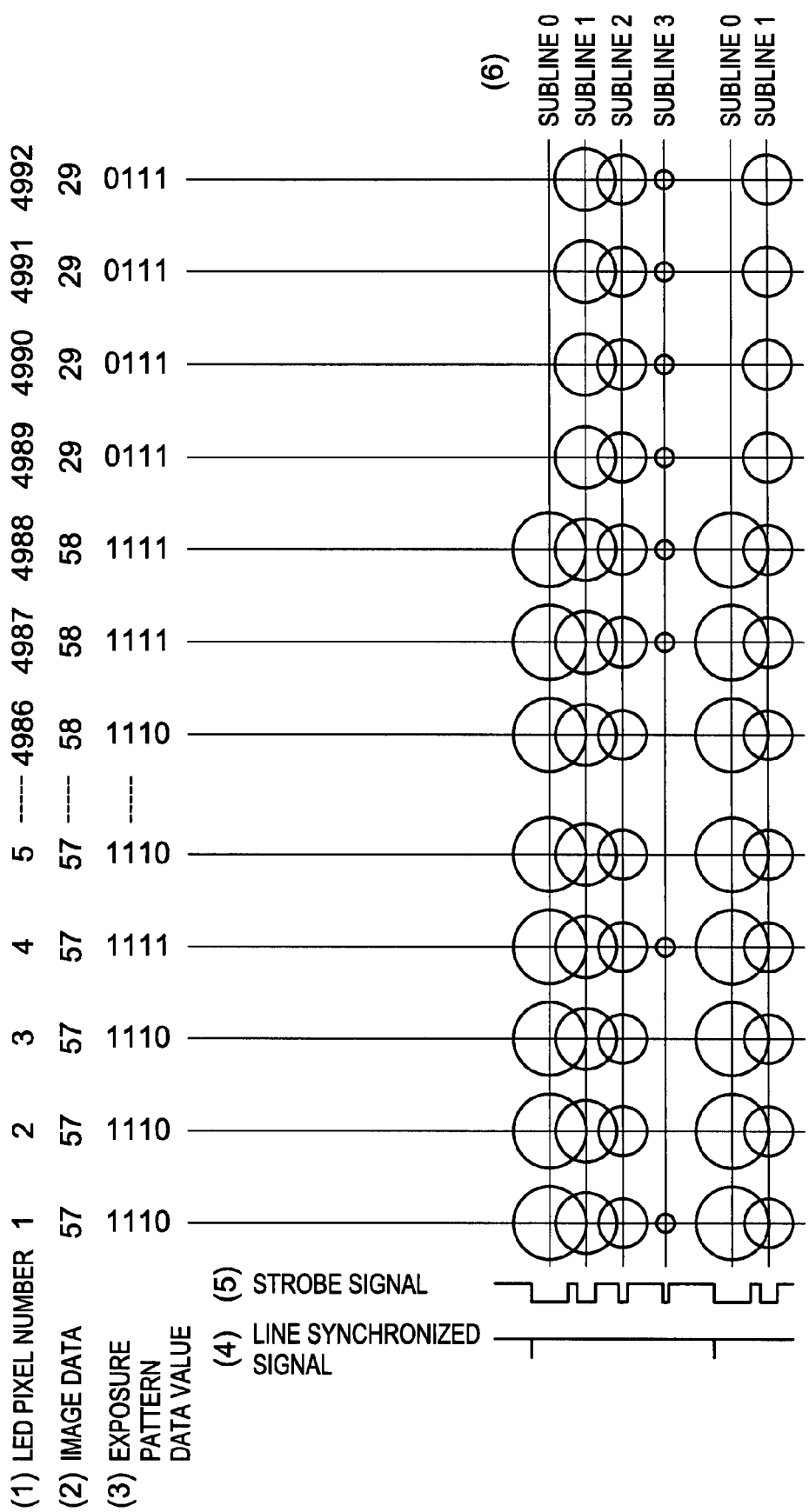
FIG. 17 is a relation diagram of exposure pattern and respective signals in embodiment 2.

FIG. 17 is a relation diagram of exposure pattern and respective signals in embodiment 2.

The drawing represents a relation between exposure pattern generated on the basis of the subline control stated above and respective signals. In an X axis direction (main scanning direction), on the most upper side, LED pixel numbers ("(1)") 1~4992 are shown; to correspond to the LED pixel numbers, image data ("(2)", one example) are respectively shown; to correspond to the image data, exposure pattern data values ("(3)", binary expression) are respectively shown. Further, in a Y axis direction (subsidiary scanning direction), line synchronized signal waveform ("(4)"), strobe signal waveform ("(5)") and subline number are shown. As shown by FIG. 17, according to the image data, the photosensitive drum 25 is exposed through driving the LED element on/off most 4 times on the basis of the different strobe signal time. Here, the size of exposure energy is represented by a diameter of exposure pattern corresponding to the pulse width of the strobe signal Ss, on 4 sublines, respective exposures are performed.

As explained above in detail, because the image forming apparatus of the present invention sets the times to drive on/off into 4 times whose time widths are different and has an ability of gradation presentation with respect to the input image data of 6 bits, it is possible to inhibit hardware from complicating and it is possible to obtain a print result with high linearity quality. Further, because used pseudo random number in occurrence of exposure pattern, there is no a rule to represent exposure patterns. Through repeating to produce exposure patterns, it is possible to prevent image noise from happening. Furthermore, in the embodiment, it is unnecessary to use an exposure pattern lookup table in embodiment 1.

Moreover, in the embodiment 2, the upper bit of the occurring random number serves as sign bit and it is added into an input image data value, then an exposure pattern data value of 4 bits is generated. However, the present invention is not limited in it. That is, it is possible to add a value output by the linear feedback shift register into the under 2 bits of the input image data value in a range that the all digits do not overflow, and drop the under 2 bits of the addition result value, then round the exposure pattern data value of 4 bits.

The utilization possibility in industry:

In the above stated explanation, only such case is explained that the present invention is applied to a printer of electronic photograph. However, the present invention is not limited in the case, the present invention can be applied to various devices such as scanner, copying apparatus, facsimile apparatus, multiplex apparatus and the like. Further, in the above explanation, such case is explained to use LED in the image forming apparatus, as exposing means. However, semiconductor laser also can be used in the image forming apparatus.

The present invention is not limited to the foregoing embodiments but many modifications and variations are possible within the spirit and scope of the appended claims of the invention.

What is claimed is:

1. An image forming apparatus comprising:
an inputting section for inputting a gradation data value P that corresponds to a single image data value;
a gradation changing section for changing the gradation data value P into a data set including a plurality of data that are each M bits, the plurality of data including first data and a second data; and
a pixel forming section for forming dots according to the first data at intersections between respective lines of N lines that extend in a main scanning direction and a first line that extends in a sub-scanning direction, and forming dots according to the second data at intersections between respective lines of the N lines that extend in the main scanning direction and a second line that extends in the sub-scanning direction and that is adjacent to the first line.

2. The image forming apparatus according to claim 1, wherein the number M equals the number N.

3. The image forming apparatus according to claim 1, wherein the pixel forming section forms dots, at each of the N lines, whose energies are different for each of the N lines.

4. The image forming apparatus according to claim 1, wherein the image forming apparatus has a lookup table, and the gradation changing section changes the gradation data value P into the data set based upon the lookup table.

5. The image forming apparatus according to claim 4, wherein the number M equals the number N, and the gradation data value P includes X bits.

6. The image forming apparatus according to claim 1, wherein the pixel forming section forms a first plurality of dots at the N lines, each of the first plurality of dots being formed at one of the N lines and having an energy that is different than others of the first plurality of dots formed at others of the N lines that the respective dot is not disposed upon.

7. An image forming apparatus comprising:
an inputting section for inputting a gradation data value P;
a gradation changing section for changing the gradation data value P into a data set including a plurality of data that are each M bits;
a pixel forming section for forming dots according to a first data of the plurality of data at intersections between respective lines of N lines that extend in a main scanning direction and a first line that extends in a sub-scanning direction, and forming dots according to a second data of the plurality of data at intersections between respective lines of the N lines that extend in the main scanning direction and a second line that extends in the sub-scanning direction and that is adjacent to the first line; and
L LEDs,
wherein each of the plurality of data corresponds to one of the LEDs, and further wherein each of the plurality of data in the data set is determined based upon n+α, wherein n=floor(P/L) and further wherein the floor is a function that maps P/L to the largest integer not greater than P/L, and α is either 0 or 1 based in part upon the corresponding LED.

8. The image forming apparatus according to claim 7, wherein α is determined according to q which is related to a remainder of P/L.

9. The image forming apparatus according to claim 8, wherein q=P−(n*L)=P−(floor(P/L)*L).

10. The image forming apparatus according to claim 7, wherein α is determined according to random number.

* * * * *